(12) United States Patent
Peiffer et al.

(10) Patent No.: US 6,391,410 B1
(45) Date of Patent: *May 21, 2002

(54) USE OF A TRANSPARENT POLYESTER FILM AS A GAS/FLAVOR BARRIER FILM

(75) Inventors: Herbert Peiffer, Mainz; Cynthia Bennett, Alzey; Guenther Crass, Taunusstein-Wehen; Gottfried Hilkert, Saulheim; Werner Roth, Eppstein, all of (DE)

(73) Assignee: Mitsubishi Polyester Film, GmbH, Wiesbaden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/274,777

(22) Filed: Mar. 24, 1999

(30) Foreign Application Priority Data

Mar. 25, 1998 (DE) .......................................... 198 13 268

(51) Int. Cl.$^7$ .......................... B32B 27/36; B32B 15/08
(52) U.S. Cl. .................... 428/35.7; 428/35.8; 428/35.9; 428/215; 428/220; 428/458; 428/480; 428/910
(58) Field of Search ................. 428/457, 458, 428/480, 483, 35.7, 35.8, 35.9, 220, 215, 910

(56) References Cited

U.S. PATENT DOCUMENTS

| | | | |
|---|---|---|---|
| 3,515,626 A | 6/1970 | Duffield ...................... | 428/325 |
| 3,958,064 A | 5/1976 | Brekken et al.. ............ | 428/336 |
| 4,042,569 A | 8/1977 | Bell et al. ..................... | 260/75 |
| 4,252,885 A | 2/1981 | McGrail et al. ............ | 430/160 |
| 4,399,179 A | 8/1983 | Minami et al. ............. | 428/212 |
| 4,493,872 A | 1/1985 | Funderburk et al. ........ | 428/480 |
| 4,615,939 A | 10/1986 | Corsi et al. ................. | 428/323 |
| 4,622,237 A | 11/1986 | Lori ............................ | 427/40 |
| 5,115,047 A * | 5/1992 | Hashimoto et al. ......... | 428/480 |
| 5,236,680 A | 8/1993 | Nakazawa et al. ....... | 423/328.1 |
| 5,236,683 A | 8/1993 | Nakazawa et al. .......... | 423/335 |
| 5,242,757 A | 9/1993 | Buisine et al. .............. | 428/480 |
| 5,429,785 A | 7/1995 | Jolliffe ....................... | 264/216 |
| 5,453,260 A | 9/1995 | Nakazawa et al. ....... | 423/327.1 |
| 5,468,527 A | 11/1995 | Peiffer et al. ................ | 428/35.7 |
| 5,506,014 A | 4/1996 | Minnick ..................... | 428/35.7 |
| 6,054,212 A * | 4/1998 | Peiffer et al. ............... | 428/336 |
| 5,955,181 A * | 9/1999 | Peiffer et al. ............... | 428/212 |
| 6,149,995 A * | 11/2000 | Peiffer et al. ............... | 428/480 |

FOREIGN PATENT DOCUMENTS

| | | |
|---|---|---|
| DE | 1694404 | 4/1971 |
| DE | 2230970 | 2/1973 |
| DE | 3801535 | 7/1988 |
| DE | 4306155 | 9/1994 |
| EP | 0 035 835 | 9/1981 |
| EP | 0 061 769 | 10/1982 |
| EP | 0 088 635 | 9/1983 |
| EP | 0 124 291 | 11/1984 |

(List continued on next page.)

OTHER PUBLICATIONS

Merriam–Webster's Collegiate Dictionary, Tenth Edition; Merriam–Webster, Incorporated; principal copyright 1993, p. 581.*
Derwent Abstract of EP 0 878 298.
Database WPI XP 002167068 and JP 09 150492 A (Jun. 10, 1997.
Patent Abstract of Japan, vol. 1997, No. 9 (Sep. 30, 1997) and JP 09 118323 A (May 6, 1997).
Barendrecht, W., et al., *Harze natürliche*, in Ullmann's Encyklopädie der Techn. Chemie [Ullman's Encyclopedia of Industrial Chemistry]$4^{th}$ Ed., vol. 12, pp 525–554. (Ullman ed., 1976).
Weiss, J., *Parameters that influence the barrier properties of metallized polyester and polypropylene films*, Thin Solid Films, vol. 204, 203–216 (1991).
Utz, H., Barriereeigenschaften Aluminiumbedampfter Kunststoffolien [Barrier Properties of Aluminum–Metalized Plastic Film]66–68 (1995)(Unpublished dissertation, Technishe Universität (Munich).
Bursch et al., "Biaxially Oriented Polyester Film for SMD Condensers—Made by Extrusion Followed by Biaxial Stretching and Heat Fixing to Give Specified Shrinkage Parameters in the Machine Directed and Transverse Direction." Derwent Abstract, WPI Acc. No. 98–194495/199818 (1998).
Database WPI, Section Ch, Week 9522, Derwent Publications Ltd., London, GB; AN 95–166886, XP002114408 & JP 07 088592 A (Toray Indus., Inc.) (Apr. 4, 1995).
Database WPI, Section Ch, Week 9615, Derwent Publications Ltd., London, GB; AN 96–148338, XP002114377 & JP 08 03679 A (Toray Indus., Inc.) (Feb. 6, 1996).

*Primary Examiner*—Paul Thibodeau
*Assistant Examiner*—Monique R. Jackson
(74) *Attorney, Agent, or Firm*—Finnegan, Henderson Farabow, Garrett & Dunner, L.L.P.

(57) ABSTRACT

The application discloses the use of a transparent, biaxially oriented polyester film having a base layer at least 80% by weight of which is composed of a thermoplastic polyester, and having at least one outer layer, where the outer layer is composed of a polymer or of a mixture of polymers which comprises at least 40% by weight of ethylene 2,6-naphthalate units and up to 60% by weight of ethylene terephthalate units and/or units from cycloaliphatic or aromatic diols and/or dicarboxylic acids, with the proviso that the $T_g2$ value of the polymer film is above the $T_g2$ value of the base layer but below the $T_g2$ value of the outer layer, has a barrier film with respect to the gases $H_2O$, $N_2$, $CO_2$, He and flavors. It is particularly suitable for packaging applications, specifically for packaging foods and other consumable items.

20 Claims, No Drawings

FOREIGN PATENT DOCUMENTS

| | | |
|---|---|---|
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0602964 A1 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 785 067 | 7/1997 |
| EP | 0 826 478 | 3/1998 |
| EP | 0 878 298 | 5/1998 |
| WO | WO 88/10188 | 12/1988 |
| WO | WO 94/13476 | 6/1994 |
| WO | WO 94/13481 | 6/1994 |
| WO | WO 98/13414 | 4/1998 |
| WO | WO 98/13415 | 4/1998 |

* cited by examiner

USE OF A TRANSPARENT POLYESTER FILM AS A GAS/FLAVOR BARRIER FILM

The invention relates to a transparent, biaxially oriented polyester film having a base layer at least 80% by weight of which is composed of a thermoplastic polyester, and having at least one outer layer. The invention also relates to the use of the film and to a process for its production.

BACKGROUND OF THE INVENTION

In many cases there is demand for food and drink packaging to have a high barrier effect with respect to gases, water vapor and flavors. For this reason, use is usually made of polypropylene films which are metallized or coated with polyvinylidene chloride (PVDC). However, metallized polypropylene films are not transparent and are therefore not used in cases where the view of the contents is likely to have added promotional effect. Although films coated with PVDC are transparent, the coating, like the metallizing, takes place in a second operation which makes the packaging markedly more expensive. Ethylene-vinyl alcohol copolymers (EVOH) likewise exhibit a strong barrier effect. However, films modified with EVOH are particularly highly sensitive to moisture, and this limits their range of application. In addition, because of their poor mechanical properties they have relatively high thickness or have to be laminated with other materials at high cost, and they are also difficult to dispose of after use. In addition to this, some raw materials are not approved by the authorities or are unsuitable for producing food and drink packaging.

It is therefore an object of the present invention to provide a transparent, biaxially oriented polyester film which presents a barrier to gases, such as water vapor, nitrogen, carbon dioxide and helium, and to flavors, and which has been improved over conventional polyester films and has the good physical properties of the known films and does not give rise to disposal problems.

DESCRIPTION OF THE INVENTION

The object is achieved by means of a biaxially oriented polyester film having a base layer at least 80% by weight of which is composed of (at least) one thermoplastic polyester, and having at least one outer layer, wherein the film has (an) outer layer(s) composed of a polymer or of a mixture of polymers which comprises at least 40% by weight of ethylene 2,6-naphthalate units and up to 40% by weight of ethylene terephthalate units and/or up to 60% of units from aliphatic, including cycloaliphatic, or aromatic diols and/or dicarboxylic acids, with the proviso that the glass transition temperature ($T^g2$ value) of the polyester film is above the $T^g2$ value of the base layer but below the $T_g2$ value of the outer layer. As metallized film, this film has $H_2O$ permeability of less than 0.10 g/(m$^2$·d), preferably less than 0.05 g/(m$^2$ d), particularly preferably less than 0.04 g/(m$^2$·d).

Preference is given to a polyester film in which the polymers of the outer layer comprise at least 65% by weight of ethylene 2,6-naphthalate units and up to 35% by weight of ethylene terephthalate units. Among these, particular preference is then given to a polyester film of the type in which the polymers of the outer layer comprise at least 70% by weight of ethylene 2,6-naphthalate units and up to 30% by weight of ethylene terephthalate units. The outer layer may, however, also be composed completely of ethylene 2,6-naphthalate polymers.

Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl- 4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

The present invention also provides a process for producing this film. It encompasses a) producing a film from base and outer layer(s) by coextrusion, b) biaxial orientation of the film and c) heat-setting of the oriented film.

To produce the outer layer, it is expedient to feed granules of polyethylene terephthalate and polyethylene 2,6-naphthalate directly to the extruder in the desired mixing ratio. At about 300° C. and with a residence time of about 5 min, the two materials can be melted and can be extruded. Under these conditions, transesterification reactions can occur in the extruder and during these copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation procedure is generally carried out sequentially or simultaneously. For the sequential stretching, it is preferable to orient firstly in a longitudinal direction (i.e. in the machine direction) and then in a transverse direction (i.e. perpendicularly to the machine direction). This causes an orientation of the molecular chains. The longitudinal orientation procedure may be carried out with the aid of two rolls running at different speeds corresponding to the stretching ratio to be achieved. For the transverse orientation procedure, use is generally made of an appropriate tenter frame. For the simultaneous stretching, the film is stretched in a tenter frame simultaneously in longitudinal and transverse directions.

The temperature at which the orientation procedure is carried out can vary over a relatively wide range and depends on the properties desired in the film. In general, the longitudinal stretching is carried out at from 80 to 1 30° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse orientation procedure may be followed by another longitudinal orientation procedure and even a further transverse orientation procedure.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—(CH$_2$)$_n$—OH, where n is an integer from 3 to 6, branched aliphatic glycols having up to 6 carbon atoms, aromatic diols of the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—, or bisphenols of the formula HO—C$_6$H$_4$—C$_6$H$_4$—OH.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexane-dicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or C$_1$–C$_{16}$-alkane-dicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

For processing the polymers, it has proven useful to select the polymers for the base layer and the outer layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). The solution viscosity is a measure of the molecular weight of the respective polymer and correlates with the melt viscosity. The chemical makeup of the polymer used may result in other correlations. For commercially available polyethylene terephthalates which are suitable for producing biaxially oriented films, the SVs are in the range from 600 to 1000. To ensure satisfactory film quality, the SV of the copolymers for the outer layer should be in the range from 300 to 900, preferably between 400 and 800, in particular between 500 and 700. If desired, a solid phase condensation may be carried out on the respective granules in order to adjust the melt viscosities of the materials as necessary. It is a general rule that the melt viscosities of the polymer melts for base and outer layer(s) should differ by not more than a factor of 5, preferably not more than a factor of from 2 to 3.

The polymers for the outer layer may be prepared in three different ways:

a) In copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.

b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET and PEN are mixed as granules in the desired ratio, and the mixture is fed to the extruder for the outer layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the outer layer. These are either directly admixed with the base layer during extrusion or are in any case present in the film due to addition of regenerated material. The proportion of these copolymers in the base layer is selected in such a way that the base layer has a partially crystalline character.

In another embodiment, the film encompasses, on the side facing away from the outer layer, another outer layer of polyethylene terephthalate, and this layer comprises pigments.

The novel film is a surprisingly high barrier with respect to gases, such as H$_2$O, N$_2$, CO$_2$, He and flavors. If, in contrast, the polymers used for the outer layer(s) have less than 40% by weight of ethylene 2,6-naphthalate units and more than 40% by weight of ethylene terephthalate units, although the film is then in some cases somewhat less permeable than a standard polyester film (100% by weight of which is composed of polyethylene terephthalate) to the gases/flavors mentioned, the permeability is still much too high. It has even been found that the gases/flavors barrier is lower than that of a standard polyester film if the outer layer comprises from 30 to 40% by weight of ethylene 2,6-naphthalate units and from 60 to 70% by weight of ethylene terephthalate units.

In said films, moreover, the glass transition temperature $T_g$ of the (co)polymer or of the (co)polymers of the outer layer(s) differs from the prior art in being higher than the glass transition temperature $T_g$ of the polymers of the base layer. The glass transition temperature of the (co)polymers used for the outer layer(s) is preferably in the range from 80 to 120° C. In the DSC (differential scanning calorimetry) determination of the glass transition temperatures, the transitions of the two layers cannot be differentiated.

Glass transitions which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer. The resolution of DSC analyzers is often insufficient to detect the glass transitions in the first heating procedure ($T_g1$) of the individual layers of the novel film, the transitions being "blurred" and small, due to orientation and crystallinity. If the specimens are melted and then rapidly cooled again to below their glass transition temperature (quenched), the orientation effects are eliminated. On renewed heating, glass transitions (designated $T^g2$ here) are then measured which have a greater intensity and are characteristic of the respective polymers. However, even here it is not possible to differentiate the glass transitions of the individual layers, since the layers mix on melting and the polyesters present therein enter into transesterification reactions with one another. It is fully sufficient, however, to compare the $T_g2$ of the entire coextruded films with the $T^g2$ of the polymer used for the base layer. In known films the $T^g2$ value of the base layer is higher than that of the coextruded film, whereas the $T_g2$ value of the outer layer is lower than that of the base layer and also than that of the coextruded film. Exactly the opposite of this applies for the novel film. Here, the $T_g2$ value of the coextruded film is higher than that of the base layer but lower than the $T^g2$ value of the outer layer.

It is expedient for the outer layer(s), as well as the base layer, to be partly crystalline. Surprisingly, it has been found that the crystallinity of the outer layers in particular has an influence on the barrier properties of the film. If the crystallinity is high, then the barrier is also high. The crystallinity of the film can be determined using FTIR spectroscopy, and for determining the crystallinity of the outer layer measurements in ATR mode should be used.

The crystallinity is determined by the presence of specific bands. The form of the crystallites ($\alpha$ or $\beta$ form) does not appear to be critical. For copolyesters containing ethylene units, the bands for the symmetrical CH-bond vibrations are at 2990 and 2971 cm$^{-1}$ ($\alpha$ form) and 2998 and 2971 cm$^{-1}$ ($\beta$ form), respectively [see F. Kimura et al., Journal of Polymer Science: Polymer Physics Vol.35, pp. 2041–2047.1007].

The base layer and the outer layer(s) may, in addition, comprise customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same makeup but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The polyester film preferably also comprises a second outer layer. The structure, thickness and makeup of a second outer layer may be selected independently of the outer layer already present, and the second outer layer may likewise comprise the abovementioned polymers or polymer mixtures and particle systems, but these do not necessarily have to be identical with those of the first outer layer. The second outer layer may also comprise other commonly used outer layer polymers.

Between the base layer and the outer layer(s), there may also be an intermediate layer if desired. It may be composed of the polymers described for the base layers. In a particularly preferred embodiment, it is composed of the polyester used for the base layer. It may also comprise the customary additives described. The thickness of the intermediate layer is generally greater than 0.3 $\mu$m and is preferably in the range from 0.5 to 15 $\mu$m, in particular from 1.0 to 10 $\mu$m.

The thickness of the outer layer(s) is generally greater than 0.1 $\mu$m and is preferably in the range from 0.2 to 6.0 $\mu$m, more preferably in the range from 0.3 to 5.5 $\mu$m, in particular from 0.3 to 5.0 $\mu$m. It is possible for the outer layers to have identical or different thicknesses.

The total thickness of the novel polyester film may vary within wide limits and depends on the application envisaged. It is preferably from 4 to 100 $\mu$m, in particular from 5 to 50 $\mu$m, preferably from 6 to 30 $\mu$m, the base layer preferably presenting a proportion of from about 40 to 90% of the total thickness.

A further advantage is that the production costs of the film are only insignificantly greater than those of a film made from standard polyester raw materials. The other properties of the film which are relevant to processing and use remain essentially unchanged or are even improved. In addition, it has been ensured that regenerated material can be used in a proportion of up to 50% by weight, preferably from 10 to 50% by weight, based on the total weight of the film in each case, in the production of the film without significant adverse effect on its physical properties.

The film has excellent suitability for packaging foodstuffs and other consumable items.

For this intended use, the films are usually metallized or are ceramically coated (e.g. with $SiO_x$, $Al_xO_y$, $Na_2SiO_4$, etc.). Surprisingly, it has been found that the gas and flavor barrier is significantly better than in conventional metallized or ceramically coated polyester films if the metal or ceramic layer is applied to the PEN-containing outer layer of the film. The barrier is particularly improved with respect to gases, such as $H_2O$, $N_2$, $CO_2$, He and flavors (limonene was used for measuring the barrier with respect to a comparative substance). The flavor barrier of the metallized film is so good that even after 14 days no flavor diffuses through the film. Even the He barrier of the metallized film is so good that this film is suitable, for example, for helium balloons. Conventional metallized polyester films are unsuitable as flavor-tight packaging or as helium balloons due to their high gas/flavor transmission. It has generally been found that, whatever the type of coating, the barrier effectiveness of the films mentioned with respect to $H_2O$, $N_2$, $CO_2$, He and flavors is better by a factor of 10 than in conventional polyester films (cf. Table 1). It has been found here that even low outer layer thicknesses of <1.5 μm, preferably <1.0 μm are sufficient to bring about the good barrier effectiveness mentioned.

The following methods were used to characterize the raw materials and the films:

The gas/flavor barrier was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid, 1% strength solution). The viscosity of this solution and that of the pure solvent were measured in an Ubbelohde viscometer. The quotient (relative viscosity η rel) was determined from the two values, 1.000 was subtracted from this, and the value multiplied by 1000. The result was the SV.

The coefficient of friction was determined according to DIN 53 375, 14 days after production.

The surface tension was determined using the "ink method" (DIN 53 364).

The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 40 pinhole.

Gloss was determined in accordance with DIN 67 530. The reflectance was measured as an optical characteristic value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

The glass transition temperatures $T_g1$ and $T_g2$ were determined using film specimens with the aid of DSC (differential scanning calorimetry). Use was made of a DuPont DSC 1090. The heating rate was 20 K/min and the specimen weight was about 12 mg. In the first heating procedure, the glass transition $T_g1$ was determined. Many of the specimens showed an enthalpy relaxation (a peak) at the beginning of the step-like glass transition. The temperature taken as $T_g1$ was that at which the step-like change in heat capacity—without reference to the peak-shaped enthalpy relaxation—achieved half of its height in the first heating procedure. In all cases, there was only a single glass transition stage in the thermogram in the first heating procedure. It is possible that the peak-shaped enthalpy relaxations obscured the fine structure of the step, or that the dissolution of the device was not adequate to separate the small, "blurred" transitions of oriented, crystalline specimens. To eliminate their heat history, the specimens were held at 300° C. for 5 minutes after the heating procedure, and then quenched with liquid nitrogen. The temperature for the glass transition $T_g2$ was taken as the temperature at which the transition reached half of its height in the thermogram for the second heating procedure.

The following examples illustrate the invention. The products used (trademarks and manufacturers) are given only once in each case, and then relate to the examples which follow.

EXAMPLE 1

The polymer for the outer layer was prepared by copolycondensation. For this, dimethyl terephthalate and 2,6-dimethyl naphthalenedicarboxylate were mixed in a reactor in a molar ratio of 0.54:1.00 (corresponding to a makeup of 30% by weight of ethylene terephthalate units and 70% by weight of ethylene 2,6-naphthalate units in the final copolymer), and then mixed with ethylene glycol and, as catalyst, 300 ppm of manganese acetate. The transesterification was carried out with stirring at from 160 to 250° C., at atmospheric pressure, and the methanol obtained during this process was distilled off. An equimolar amount of phosphoric acid, as stabilizer, and 400 ppm of antimony trioxide, as catalyst, were then added. The polycondensation was carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized.

EXAMPLE 2

Commercially available polyethylene terephthalate pellets and polyethylene 2,6-naphthalate pellets were used. In each case, the pellets were crystallized and dried for about 4 h at a temperature of about 160° C. The two materials in a ratio of 30:70 (30% by weight of polyethylene terephthalate and 70% by weight of polyethylene 2,6-naphthalate) were then placed in a mixer, where they were homogenized by stirring. The mixture was then passed to a twin-screw compounder (ZSK from Werner and Pfleiderer, Stuttgart), where it was extruded at a temperature of about 300° C. and with a residence time of about 3 min. The melt was extruded and chipped. A copolymer was produced in the extrusion by reaction between the polyethylene terephthalate and polyethylene 2,6-naphthalate.

EXAMPLE 3

Example 2 was repeated, but, for production of the film, chips of polyethylene terephthalate and of polyethylene 2,6-naphthalate were fed in a mixing ratio of 3:7 directly to the single-screw extruder, where the two materials were extruded at about 300° C. The melt was filtered and extruded through a coextrusion die to give a flat film, and laid as outer layer onto the base layer. The coextruded film was discharged across the die lip and solidified on a chill roll. The residence time of the two polymers in the extrusion was about 5 min. Further processing steps were as given above. Here, too, the copolymer was produced in the extrusion under the conditions given.

EXAMPLE 4

Chips of polyethylene terephthalate were dried at 160° C. to a residual moisture of less than 50 ppm and fed to the extruder for the base layer. Besides this, chips of polyethylene terephthalate and polyethylene 2,6-naphthalate (in a weight ratio of 3:7) were likewise dried at 160° C. to a residual moisture of 50 ppm and fed to the two extruders for the outer layers. The extruder conditions for the outer layers were as in Example 3.

A transparent three-layer film of symmetrical structure and an overall thickness of 12 μm was then produced by coextrusion followed by stepwise orientation in the longitudinal and transverse directions. Each of the outer layers had a thickness of 2.0 μm.

Base layer:
95% by weight of polyethylene terephthalate (RT 49 from Hoechst AG) having an SV of 800 and
5% by weight of masterbatch made from 99% by weight of polyethylene terephthalate and 1.0% by weight of silica particles (SYLOBLOC® 44 H from Grace) having an average particle size of 4.5 μm.

Outer layers:
70% by weight of polyethylene 2,6-naphthalate (POLYCLEAR® N 100 prepolymer from Hoechst AG) having an SV of 800,
20% by weight of polyethylene terephthalate having an SV of 800 and
10% by weight of masterbatch made from 99.0% by weight of polyethylene terephthalate and 1.0% by weight of silica particles having an average particle size of 2.0 μm.

The individual steps were:

| Extrusion | Temperatures | |
| --- | --- | --- |
| | Outer layer | 300° C. |
| | Base layer | 300° C. |
| | Temperature of the take-off roll | 30° C. |
| | Die gap width | 1 mm |
| | Temperature of the take-off roll | 30° C. |
| Longitudinal stretching | Temperature | 85–135° C. |
| | Longitudinal stretching ratio | 4.0:1 |
| Transverse stretching | Temperature | 85–135° C. |
| | Longitudinal stretching ratio | 4.0:1 |
| Setting | Temperature | 230° C. |

The film had the required gas/flavor barrier properties.

EXAMPLE 5

In a manner similar to that of Example 4, a three-layer film having an overall thickness of 12 μm was produced by coextrusion. The outer layer A had a thickness of 2.0 μm, the outer layer C a thickness of 1.5 μm.

Base layer:
100% by weight of polyethylene terephthalate having an SV of 800

Outer layer A:
70% by weight of polyethylene 2,6-naphthalate having an SV of 800,
20% by weight of polyethylene terephthalate having an SV of 800 and
10% by weight of masterbatch made from 99.0% by weight of polyethylene terephthalate and 1.0% by weight of silica particles having an average particle size of 2.0 μm.

Outer layer C:
80% by weight of polyethylene terephthalate having an SV of 800 and
20% by weight of masterbatch made from 99.0% by weight of polyethylene terephthalate and 1.0% by weight of silica particles, 50% of which had an average particle size of 2.5 μm and 50% of which had an average particle size of 1.0 μm.

The process conditions for all layers were as in Example 4.

EXAMPLE 6

A coextruded film having the recipe of Example 5, where outer layer A was 2.0 μm thick and had the following makeup:
90% by weight of polyethylene 2,6-naphthalate having an SV of 800 and
10% by weight of masterbatch made from 99.0% by weight of polyethylene terephthalate and 1.0% by weight of silica particles having an average particle size of 1.0 μm, was produced under the process conditions of Example 4.

EXAMPLE 7

A coextruded film having the recipe of Example 5, where outer layer A was 2.5 μm thick and had the following makeup:
90% by weight of polyethylene 2,6-naphthalate having an SV of 800 and
10% by weight of masterbatch made from 99.0% by weight of polyethylene 2,6-naphthalate having an SV of 800 and 1.0% by weight of silica particles having an average particle size of 1.0 μm, was produced under the process conditions of Example 4, but the temperatures of longitudinal and transverse stretching were now raised by about10° C.

EXAMPLE 8

A three-layer coextruded film having a base layer and two outer layers was produced in a manner similar to that of Example 5. The overall thickness of the film was 12 μm. Outer layer A had a thickness of 3 μm, and outer layer C of 1.5 μm.

Base layer:
100% by weight of polyethylene terephthalate having an SV of 800

Outer layer A:
100% by weight of polyethylene 2,6-naphthalate having an SV of 800

Outer layer C:
80% by weight of polyethylene terephthalate having an SV of 800 and
20% by weight of masterbatch made from 99.0% by weight of polyethylene terephthalate and 1.0% by weight of silica particles, 50% of which had an average particle size of 2.5 μm and 50% of which had an average particle size of 1.0 μm.

The process conditions for all layers were as given in Example 7.

EXAMPLE 9

A coextruded film was produced in a manner similar to that of Example 4, but the copolymer for the outer layers was now prepared as in Example 2. In other respects, the conditions corresponded to those in Example 4.

EXAMPLE 10

A coextruded film was produced in a manner similar to that of Example 4, but the copolymer for the outer layers was now prepared as in Example 1. In other respects, the conditions corresponded to those in Example 4.

EXAMPLE 11

A coextruded two-layer film having a base layer and an outer layer was produced in a manner similar to that of Example 4. The overall thickness of the film was 12 µm, the outer layer having a thickness of 3 µm.

Base layer:
- 80% by weight of polyethylene terephthalate having an SV of 800 and
- 20% by weight of masterbatch made from 99.0% by weight of polyethylene terephthalate and 1.0% by weight of silica particles, 50% of which had an average particle size of 2.5 µm and 50% of which had an average particle size of 1.0 µm.

Outer layer:
- 60% by weight of polyethylene naphthalate having an SV of 800,
- 30% by weight of polyethylene terephthalate having an SV of 800 and
- 10% by weight of masterbatch made from 99.0% by weight of polyethylene terephthalate and 1.0% by weight of silica particles having an average particle size of 2.0 µm.

The process conditions for all layers were as given in Example 4.

EXAMPLE 12

A three-layer film was produced as described in Example 7, but with the single difference that the thickness of outer layer A was only 1.0 µm.

Comparative Example 1C

A film was produced in a manner similar to that of Example 11. For outer layer A, however, use was made of a copolyester of 82% by weight of ethylene terephthalate and 18% by weight of ethylene isophthalate.

Comparative Example 2C

A film was produced in a manner similar to that of Example 11. For outer layer A, use was now made of a polymer mixture made from 70% by weight of ethylene terephthalate and 30% by weight of ethylene 2,6-naphthalate.

Comparative Example 3C

A film was produced in a manner similar to that of Example 11. For outer layer A, use was now made of a polymer mixture of 90% by weight of ethylene terephthalate and 10% by weight of ethylene 2,6-naphthalate.

Comparative Example 4C

A single-layer PET film was produced with the following layers:
- 80% by weight of polyethylene terephthalate having an SV of 800 and
- 20% by weight of masterbatch made from 99.0% by weight of polyethylene terephthalate and 1.0% by weight of silica particles, 50% of which had an average particle size of 2.5 µm and 50% of which had an average particle size of 1.0 µm.

Comparative Example 5C

A single-layer PEN film was produced with the following makeup:
- 80% by weight of polyethylene 2,6-naphthalate having an SV of 1000 and
- 20% by weight of masterbatch made from 99.0% by weight of polyethylene 2,6-naphthalate and 1.0% by weight of silica particles, 50% of which had an average particle size of 2.5 µm and 50% of which had an average particle size of 1.0 µm.

The film had very good barrier properties; however, due to high production costs it is unsuitable for food and drinks packaging.

Table 1 shows the permeation rates for various substances through the various film types and also shows the test conditions and methods. The compositions and properties of the films produced in Examples 4 to 12 and 1C to 5C are given in Tables 2 and 3.

TABLE 1

| Permeating substance | Novel film metallized, OD 2.6 | Novel film $SiO_x$-coated | Novel film $Al_2O_3$-coated | Unit | Test conditions | Test method |
|---|---|---|---|---|---|---|
| Oxygen | <0.08 | <0.6 | <0.6 | $cm^3/(m^2 \cdot d \cdot bar)$ | 23.0° C. 50% r.h. | DIN 533800 Part 3 |
| Water vapor | <0.04 | <0.3 | <0.3 | $g/(m^2 \cdot d)$ | 23.0° C. 85% r.h. | DIN 53122 Part 2 |
| Water vapor | <0.09 | <0.7 | <0.7 | $g/(m^2 \cdot d)$ | 37.8° C. 90% r.h. | DIN 53122 Part 2 |
| Nitrogen | <0.1 | <0.1 | <0.1 | $cm^3/(m^2 \cdot d \cdot bar)$ | 23.0° C. 0% r.h. | DIN 53380 Part 1 |
| Carbon dioxide | <0.5 | <2.5 | <2.5 | $cm^3/(m^2 \cdot d \cdot bar)$ | 23.0° C. 0% r.h. | DIN 53380 Part 1 |
| Limonene | $<8.10 \cdot 10^{-6}$ | $<8 \cdot 10^{-6}$ | $<8 \cdot 10^{-6}$ | $g/(m^2 \cdot d)$ | | Internal method (GC) |

TABLE 2

| Example No. | Ethylene 2,6-naphthalate units in outer layer A (in % by weight) | Ethylene terephthalate units in outer layer A (in % by weight) | Ethylene isophthalate units in outer layer A (in % by weight) | $T_g2$ (in ° C.) |
|---|---|---|---|---|
| 4 | 70 | 30 | 0 | 82.5 |
| 5 | 70 | 30 | 0 | 81.0 |
| 6 | 90 | 10 | 0 | 86.0 |
| 7 | 100 | 0 | 0 | 90.0 |
| 8 | 100 | 0 | 0 | 90.0 |
| 9 | 70 | 30 | 0 | 82.5 |
| 10 | 70 | 30 | 0 | 82.5 |

TABLE 2-continued

| Example No. | Ethylene 2,6-naphthalate units in outer layer A (in % by weight) | Ethylene terephthalate units in outer layer A (in % by weight) | Ethylene isophthalate units in outer layer A (in % by weight) | $T_g2$ (in °C.) |
|---|---|---|---|---|
| 11 | 60 | 40 | 0 | 83.0 |
| 12 | 100 | 0 | 0 | 86.0 |
| 1C | 0 | 82 | 18 | 72.0 |
| 2C | 30 | 0 | 0 | 81.0 |
| 3C | 10 | 50 | 0 | 80.5 |
| 4C | 100 | 0 | 0 | 80.0 |
| 5C | 0 | 100 | 0 | 115 |

TABLE 3

| Example No. | Film thickness (μm) | Outer layer thickness A/C(A) (μm) | Film structure | Oxygen permeability (cm³/(m² bar d)) | Gloss (60° angle of measurement) Side A | Gloss (60° angle of measurement) Side C | Haze |
|---|---|---|---|---|---|---|---|
| 4 | 12 | 2.0/2.0 | ABA | 70 | 175 | 175 | 2.5 |
| 5 | 12 | 2.0/1.5 | ABC | 80 | 174 | 175 | 2.6 |
| 6 | 12 | 2.0/1.5 | ABC | 65 | 176 | 175 | 2.5 |
| 7 | 12 | 2.5/1.5 | ABC | 55 | 155 | 155 | 4.0 |
| 8 | 12 | 3.0/1.5 | ABC | 45 | 160 | 155 | 4.0 |
| 9 | 12 | 2.0/2.0 | ABA | 70 | 175 | 175 | 2.5 |
| 10 | 12 | 2.0/2.0 | ABA | 70 | 175 | 175 | 2.5 |
| 11 | 12 | 3.0 | AB | 80 | 175 | 178 | 1.5 |
| 12 | 12 | 1.0/1.0 | ABC | 62 | 160 | 165 | 3.5 |
| 1C | 12 | 3.0 | AB | 102 | 145 | 160 | 3.0 |
| 2C | 12 | 3.0 | AB | 110 | 120 | 150 | 6.5 |
| 3C | 12 | 3.0 | AB | 95 | 175 | 175 | 1.5 |
| 4C | 12 | 0 | A | 100 | 175 | 178 | 4.0 |
| 5C | 12 | 0 | A | 30 | 175 | 178 | 4.0 |

What is claimed is:

1. A method of impeding the flow of the gases $H_2O$, $N_2$, $CO_2$, He or flavors through the packaging of a foodstuff, comprising packaging the foodstuff with a transparent, biaxially oriented polyester film comprising:
   (A) a base layer, at least 80% by weight of which is composed of a thermoplastic polyester;
   (B) at least one outer layer, wherein the outer layer is composed of a polymer or of a mixture of polymers comprising at least 40% by weight of ethylene 2,6-naphthalate units; optionally up to 40% by weight of ethylene terephthalate units; and optionally up to 60% by weight of units from aliphatic diols, cycloaliphatic diols, aromatic diols, aliphatic dicarboxylic acids, cycloaliphatic dicarboxylic acids, aromatic dicarboxylic acids, or a combination thereof,
   wherein the glass transition temperature ($T^g2$ value) of the polyester film is above the $T_g2$ value of the base layer but below the $T_g2$ value of the outer layer, and
   wherein the transparent, biaxially oriented polyester film impedes the flow of the gases $H_2O$, $N_2$, $CO_2$, He or flavors.

2. The method as claimed in claim 1, wherein the outer layer of the film comprises at least 65% by weight of ethylene 2,6-naphthalate units.

3. The method as claimed in claim 1, wherein the outer layer of the film comprises at least 70% by weight of ethylene 2,6-naphthalate units.

4. The method as claimed in claim 1, wherein the film has been metallized and has an $H_2O$ permeability of less than 0.10 g/(m²·d).

5. The method as claimed in claim 1, wherein the film has been metallized and has an $H_2O$ permeability of less than 0.05 g/(m²·d).

6. The method as claimed in claim 1, wherein the film has been metallized and has an $H_2O$ permeability of less than 0.04 g/(m²·d).

7. The method as claimed in claim 1, wherein the outer layer of the film has a thickness of from 0.2 to 6 μm.

8. The method as claimed in claim 1, wherein the outer layer of the film has a thickness of from 0.3 to 5.5 μm.

9. The method as claimed in claim 1, wherein the outer layer of the film has a thickness of from 0.3 to 5.0 μm.

10. The method as claimed in claim 1, wherein the film has two layers and is composed of the base layer and the outer layer.

11. The method as claimed in claim 1, having two outer layers, one on each side of the base layer.

12. The method as claimed in claim 1, wherein at least one of the outer layers of the film has been pigmented.

13. The method as claimed in claim 1, wherein at least one side of the film has been corona-treated.

14. The method as claimed in claim 1, wherein at least one side of the film has been in-line coated.

15. The method as claimed in claim 1, wherein the film has been metallized or has been coated with $SiO_x$ or $Al_xO_y$.

16. A method as claimed in claim 1, wherein the film further comprises one or more intermediate layers located between the base layer and the outer layer or outer layers.

17. A method as claimed in claim 1, wherein the base layer is composed of at least 90% by weight of the thermoplastic polyester.

18. A method as claimed in claim 1, wherein the thermoplastic polyester is composed of at least 90 mol % of ethylene glycol units and terephthalic acid units or of ethylene glycol units and naphthalene-2,6-dicarboxylic acid units.

19. A method as claimed in claim 1, wherein the thermoplastic polyester is composed of at least 95 mol % of ethylene glycol units and terephthalic acid units or of ethylene glycol units and naphthalene-2,6-dicarboxylic acid units.

20. A method as claimed in claim 1, wherein the film has a total thickness of from 4 to 100 μm.

* * * * *

Disclaimer 6,391,410—Herbert Peiffer, Mainz; Cynthia Bennett, Alzey; Guenther Crass, Taunusstein-Wehen; Gottfried Hilkert, Saulheim; Werner Roth, Eppstein, all of DE. USE OF A TRANSPARENT POLYESTER FILM AS A GAS/FLAVOR BARRIER FILM. Patent dated May 21, 2002. Disclaimer filed by the assignee September 10, 2002, Mitsubishi Polyester Film GmbH.

The term of this patent shall not extend beyond the expiration date of Pat. No. 6,149,995.

*(Official Gazette, July 15, 2003)*